Figure 1:
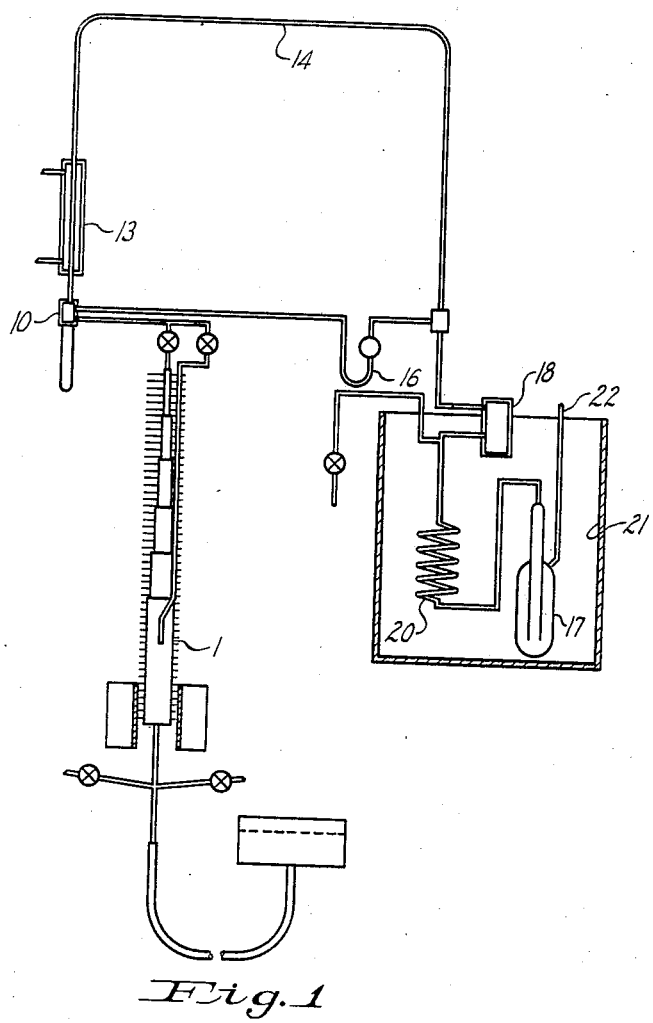

Feb. 1, 1944.    D. C. HOLMES    2,340,751
VOLUMETER FOR CONTINUOUS MEASUREMENT
Filed Dec. 13, 1941

INVENTOR.
Donald C. Holmes
BY William B. Jaspert
Attorney.

Patented Feb. 1, 1944

2,340,751

UNITED STATES PATENT OFFICE 2,340,751

VOLUMETER FOR CONTINUOUS MEASUREMENT

Donald C. Holmes, Blawnox, Pa., assignor to Burrell Technical Supply Company, Pittsburgh, Pa., a corporation of Pennsylvania Application December 13, 1941, Serial No. 422,824

2 Claims. (Cl. 73—194)

This invention relates to new and useful improvements in volumeters for measurement of gases and it is among the objects thereof to provide an instrument for the continuous measurement and recording of the volume of gases which may be recorded as they are passed through the instrument.

It is a further object of the invention to provide a volumeter of simple, economical construction adapted to handle corrosive gases without damage to the apparatus which shall employ a small volume of sealing liquid.

It is a further object of the invention to provide a volumeter which shall be adapted for use with electrical recording devices.

Figure 2:
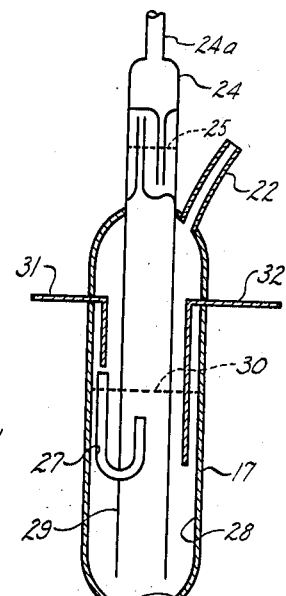

These and other objects of the invention will become more apparent from a consideration of the accompanying drawing constituting a part hereof in which like reference characters designate like parts and in which:

Fig. 1 is a diagrammatic view showing the adaptation of the invention for use with a gas fractionating column; and Fig. 2 a cross-sectional elevational view of the volumeter embodying the principles of this invention.

For the purpose of illustration, the volumeter is shown operatively connected to a fractionating column which is designated by the reference numeral 1, and which is in a form of a gradually reducing chamber, details of which do not constitute any part of the present invention.

The gases to be measured are distilled from the column 1 and pass through a separator 10 and condenser 13 to a delivery tube 14. The rate of distillation is maintained substantially constant by a control manometer 16, and its associated electrical apparatus, details of which are unessential to an understanding of the invention. The gas from the fractionating column or from any other source is passed through a thermal conductivity cell 18 and then through a temperature equalizing coil 20 from which it passes through the volumeter 17 that is disposed in a constant temperature bath maintained in the tank 21.

The gases leave the volumeter through tube 22 where they may be collected or simply discharged to the atmosphere. The volumeter 17 is more clearly shown in Fig. 2 of the drawing and is in the form of a cylinder having hemispherical ends, the top wall of which is sealed to a cylinder forming a safety chamber 24 at the top which is intended to prevent water, designated at the level 25, from being carried into the supply line 24a that feeds chamber 24 if flow is momentarily reversed.

Chamber containing level 25 constitutes a humidifying chamber through which the gas is bubbled and the large cylinder constitutes a measuring chamber immediately below the humidifier. The measuring chamber communicates with an annular discharge chamber 33 at the bottom of the instrument and a U-tube 27 extends from the measuring chamber to the discharge chamber through an annular partition wall 29 into which it is sealed. The U-tube is commonly sealed by water or other confining liquid which is introduced in the instrument up to level 30. Electrodes 31 and 32 extend into the instrument, the electrode 31 being of such length that it terminates above the normal water level in the discharge chamber, but contacts the water when the level rises. Terminal 31 and the short leg of U-tube 27 are spaced equal distances above and below the normal level 30. The electrode 32 is of such length that it contacts the sealing liquid at all times.

These electrodes are connected to an electrical recording instrument, such as an electronic relay with a counter or recorder, which relay constitutes the subject matter of my application Serial No. 403,553 filed July 22, 1941.

The operation of the above described volumeter is briefly as follows:

The gas as it is admitted through the delivery tube 24a forces the sealing liquid out of the measuring chamber into the annular space until the inner level is below the short end of the U-tube 27. This displacement action causes the level 30 to rise in the annular chamber to contact the short electrode 31 which energizes the electrical recording instrument, such as an electronic relay to actuate a counter or recorder that registers a unit volume of the gas. When the inner liquid level is forced still lower below the end of the U-tube, the volume of gas forces the sealing liquid out of the U-tube and flows into the discharge chamber. This releases the pressure in the measuring chamber and allows the liquid levels to return to their normal position as indicated at 30, at which time the relay contact is broken. This action re-fills the U-tube 27 with liquid and causes the cycle to repeat itself.

The volumeter may be made of glass or other suitable material, and in proportion to adapt it to a particular application. In normal use, for measuring fractionated gases, one operation is equivalent to about 10 ml. and is reproduceable from volume to volume. This is a much smaller increment than any that can be accurately measured by volumeters heretofore employed.

It is evident from the foregoing description of the invention that volumeters made in accordance therewith provide accurate and reliable recording means for measuring gases from fractionating columns or any other source.

Although one embodiment of the invention has been herein illustrated and described, it will be evident to those skilled in the art that various modifications may be made in the details of construction without departing from the principles herein set forth.

I claim:

1. A volumeter comprising a main fluid chamber, a measuring chamber within said main chamber having an open bottom communicating with said main chamber, a gas supply passage connecting the top of the measuring chamber and a gas outlet passage communicating with the top of the main chamber, electrodes extending through the walls of the main chamber comprising a long and a short terminal, a U-tube sealed in the partition wall of the inner chamber having a long extension in one chamber and a short extension in the other of said chambers, and sealing liquid in said chambers of a volume to normally maintain the level of the liquid between the terminal ends and to cover one end of the U-tube, said U-tube being operative in response to the gas pressure in the measuring chamber to displace the liquid from the measuring chamber to increase the level of the liquid in the main chamber until it engages the short terminal to establish an energizing circuit of an indicating device, and when the level of the measuring chamber falls below the bight of the U-tube to restore the pressure balance between the measuring and main chambers, the short terminal and the short leg of the U-tube being spaced an equal distance above and below the normal level of the liquid in said chambers.

2. A volumeter having an outer and inner chamber communicating at the bottom thereof, a U-tube sealed in the wall of the inner chamber with its legs extending vertically upward, the leg in the inner chamber terminating below and the leg of the tube in the outer chamber terminating above the normal level of the liquid, a pair of electrodes extending through the wall of the outer chamber, one of which being of a length to extend a substantial distance below the normal level of the liquid and the other terminating short of the normal level of the liquid an amount equal to the spacing of the leg of the tube in the inner chamber from the normal level of the liquid whereby a definite volume of gas will be measured when the seal of the U-tube is broken.

DONALD C. HOLMES.